United States Patent [19]

Bertrand

[11] Patent Number: 5,237,701
[45] Date of Patent: Aug. 17, 1993

[54] DATA UNPACKER USING A PACK RATIO CONTROL SIGNAL FOR UNPACKED PARALLEL FIXED M-BIT WIDTH INTO PARALLEL VARIABLE N-BIT WIDTH WORD

[75] Inventor: Keith J. Bertrand, Sunnyvale, Calif.

[73] Assignee: Ampex Systems Corporation, Redwood City, Calif.

[21] Appl. No.: 333,169

[22] Filed: Mar. 31, 1989

[51] Int. Cl.[5] .................. H03M 7/44; G06F 5/00
[52] U.S. Cl. .................. 395/800; 364/DIG. 2; 364/951.1; 364/951.5; 364/260.4; 364/260.7; 341/60; 341/67; 341/87
[58] Field of Search .................. 341/60, 67, 87; 364/200 MS File, 900 MS File; 395/800

[56] References Cited

U.S. PATENT DOCUMENTS

| | | | |
|---|---|---|---|
| 3,701,893 | 10/1972 | Shimaya et al. | 341/60 |
| 4,044,347 | 8/1977 | Van Voorhis | 341/67 |
| 4,141,005 | 2/1979 | Bonner et al. | 341/60 |
| 4,376,933 | 3/1983 | Saran et al. | 341/67 |
| 4,573,034 | 2/1986 | Schouhamer-Immink | 341/95 |
| 4,593,267 | 6/1986 | Kuroda et al. | 341/60 |
| 4,809,232 | 2/1989 | Baumbaugh et al. | 365/221 |
| 4,899,147 | 2/1990 | Schiavo et al. | 341/60 |
| 4,963,867 | 10/1990 | Bertrand | 341/60 |

Primary Examiner—Thomas C. Lee
Assistant Examiner—Krisna Lim

[57] ABSTRACT

The data unpacker receives packed parallel input data words having a fixed width of m bits, and it outputs parallel data words having a variable width of n bits. An input register stores the received words and applies them to a bit shifter. The bit shifter shifts the received data by a number of bit positions indicated by a shift control signal, and the shifted data is output therefrom as a parallel output word having n valid bits. The number n for each output word is received by the unpacker as a binary number. When $n \geq m$, a most significant (MSB) bit portion of that number is applied as first MSB control signal. The least significant bit (LSB) portion of n is applied to an adder which adds subsequently received LSB portions to provide a running sum. When the running sum is equal to or greater than m, the adder provides a second MSB control signal, corresponding to the most significant bit of the running sum. The least significant bit portion of the running sum is applied to the bit shifter as the shift control signal. A logic circuit receives the first and second control MSB control signal and it provides in response to either of these signals a READY FOR DATA control signal indicating that the input register is ready to receive the next input word, and a DATA VALID OUT control signal indicating that the bit shifter is ready to output the parallel output word.

10 Claims, 5 Drawing Sheets

DATA UNPACKER USING A PACK RATIO CONTROL SIGNAL FOR UNPACKED PARALLEL FIXED M-BIT WIDTH INTO PARALLEL VARIABLE N-BIT WIDTH WORD

CROSS REFERENCE TO RELATED APPLICATIONS

Apparatus For Packing Parallel Data Words Having A Variable Width Into Parallel Data Words Having A Fixed Width, U.S. Pat. No. 4,963,867 filed Mar. 31, 1989 by Keith Bertrand.

This invention relates to an apparatus for unpacking data which is received in the form of packed parallel data words having a fixed width of m valid bits, and for providing parallel output data words of a variable width of n valid bits where n, m are positive integers.

BACKGROUND OF THE INVENTION

Data packing and unpacking is often necessary when parallel words of a variable width are to be transmitted or recorded utilizing transmission lines or recording/playback equipment which requires data arranged in parallel words having a predetermined width. Another example for using data packing and unpacking is in coding or data compression applications. Known data unpackers utilize parallel-to-serial conversion to convert the packed data into serial data, followed by serial-to-parallel conversion for converting the serial data into parallel words of a variable width, corresponding to the width of the original data words prior to packing. There is a significant disadvantage associated with these prior art data unpackers that a high frequency serial clock is required for the data conversion, whose frequency may exceed the maximum operation frequency of most types of known logic circuits. Generation of the serial clock requires a phase locked loop, whose incorporation decreases the available space on the circuit board, while it increases the number of circuit elements, and therefore also the cost. While for example the well known emitter couple logic (ECL) type logic circuitry may satisfy the high frequency requirement, it is known to have a relatively low packing density, and it requires a relatively high current power supply. Therefore the use of above-indicated known data unpackers is not practical for high packing density, low power and low cost applications. A further disadvantage is that it is difficult to format the data into blocks for synchronization when parallel-to-serial conversion is used because such formatting generally involves inserting additional bits into the serial bit stream, requiring another, higher rate serial clock and the use of high rate first-in, first-out data storage buffers.

SUMMARY OF THE INVENTION

The data unpacker of the invention overcomes the above-described disadvantages of known unpackers by directly converting packed parallel data words of a fixed width m into output parallel data words of a variable width n, where n may vary during the operation from one output data word to the next. The use of parallel-to-serial conversion is eliminated by the apparatus of the invention.

In accordance with the invention, the data unpacker receives packed parallel input words having a fixed width of m valid data bits, and it provides parallel output data words having a width equal to a variable number of n valid data bits. The input words are received and stored in an input register in the received order and applied therefrom to a bit shifter. The bit shifter shifts the data by a number of bit positions indicated by a shift control signal. The shifted data from the bit shifter is output as a parallel output word having n valid bits. The number n for each output word is indicated by a pack ratio control signal which is received by the unpacker. The pack ratio has a most significant bit (MSB) portion when $n \geq m$, which MSB portion provides a first MSB control signal. A least significant bit (LSB) portion of the pack ratio, which corresponds to the least significant bits of number n, is applied to an adder. The adder sums subsequently received LSB portions of the pack ratio to provide a running sum, and it provides a second MSB control signal when the running sum is equal to or greater than m. The LSB portion of the running sum is the above-mentioned shift control signal. A logic circuit receives the first and the second MSB control signal and it provides in response to either of these signals a READY FOR DATA control signal indicating that the input register is ready to receive the next input word, and it also provides a DATA VALID OUT control signal indicating that the bit shifter is ready to output the parallel output word.

It is a particular advantage of the unpacker of the invention that it does not need parallel-to-serial data conversion. In systems that use parallel-to-serial conversion the serial clock rate needed is n-times the input parallel clock rate. In the unpacker of the invention the maximum clock rate needed is n/m rounded up to the nearest integer multiplied by the input parallel clock rate. The lower clock rate allows the use of slower logic circuits, resulting in lower cost, lower power and higher circuit integration.

DETAILED DESCRIPTION

Figure 1:
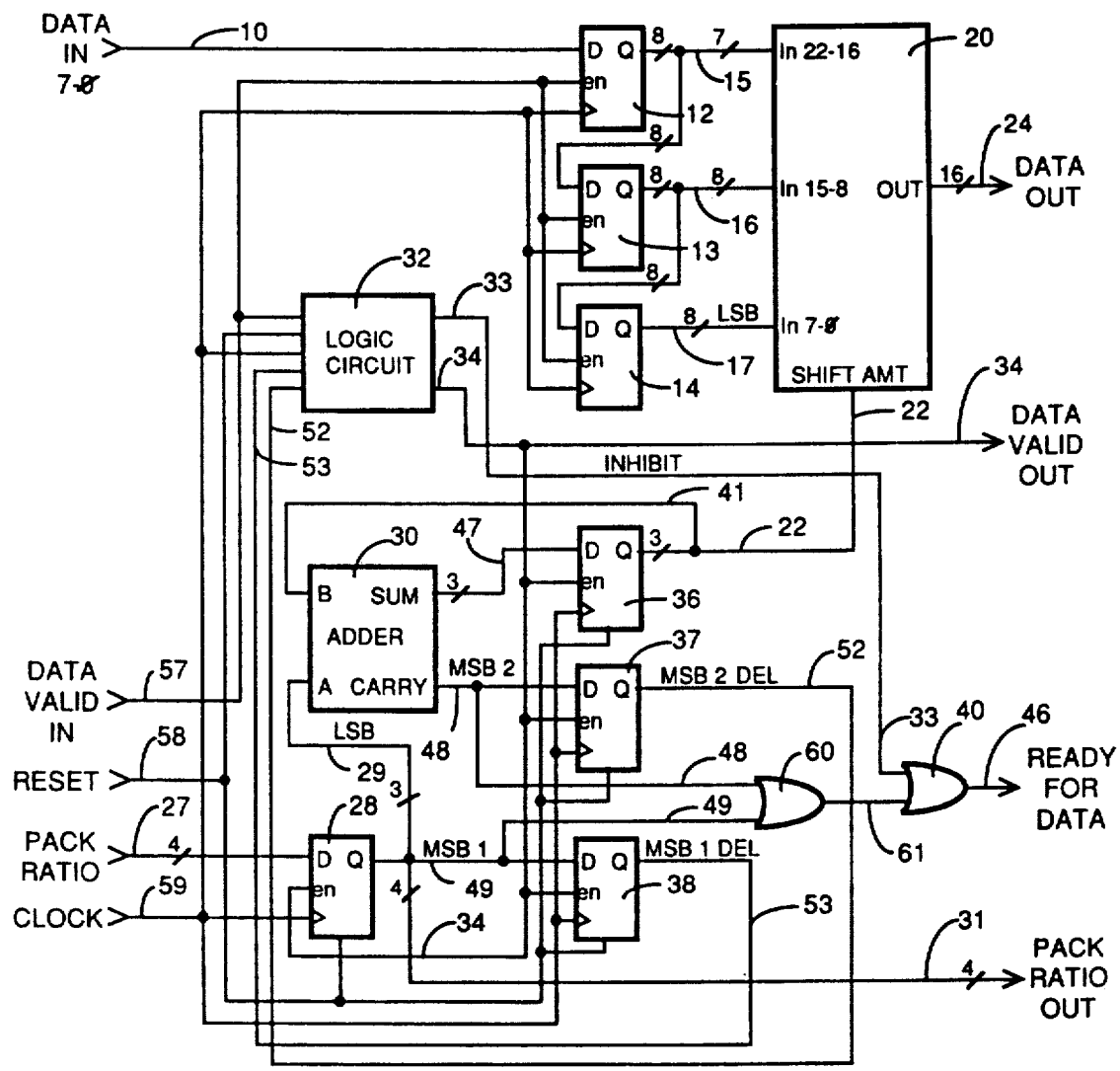
FIG. 1 is a simplified block diagram of a preferred embodiment of the data unpacker in accordance with the invention.

It is noted that in the following description corresponding circuit elements are designated by like reference numerals in all the drawing Figures to facilitate comparison.

A simplified block diagram of the preferred embodiment of the data unpacker of the present invention is described below with reference to FIG. 1. In this example packed parallel input words, having a fixed width $m = 8$ bits, are received on parallel input lines 10 from an external data sending device (not shown). Each input word is clocked in succession into an input register, which in the preferred embodiment is implemented by three parallel 8-bit flip-flop registers 12 to 14, connected in a pipeline. To simplify the description, it is assumed that in the presently described embodiment the data unpacker of FIG. 1 has been initialized, and that all three pipeline registers are filled with valid data. Thus during normal operation there are 3 consecutive packed input data bytes present on the output lines 15 to 17 of registers 12 to 14. The parallel data on lines 15 to 17 is applied to respective parallel inputs of a bit shifter 20, where the data on lines 17 is applied to LSB locations and on lines 15 to MSB locations of the bit shifter. The bit shifter 20 receives the parallel data at its input and outputs shifted data at its output. It shifts the received data in the direction of the LSB locations by a number of bit positions, or shift amount, as indicated by a shift control signal on line 22, as it will follow from further description.

In the preferred embodiment the bit shifter 20 may be implemented for example by a commercially available 32-bit barrel shifter, type SN54AS8838 or SN74AS8838, manufactured by Texas Instruments corporation. However, a data unpacker apparatus in accordance with the invention has been built utilizing a programmable Logic Cell Array, type 3020, manufactured by XILINX Corporation. The bit shifter 20 of the preferred embodiment outputs 16 bit parallel words on lines 24, where n bits of each output word are valid bits. In the preferred embodiment n=1 to 16, and it may change during the operation. A PACK RATIO control signal on line 27 is received, indicating the number n of valid bits in each consecutive parallel output data word on output lines 24 from the bit shifter 20. When n is constant during a particular operation, the signal on lines 27 is set to a binary representation of that number. In other applications where n changes during operation, the binary values to be applied on lines 27 may be stored for example in a look-up table in a programmable read only memory (PROM), and applied therefrom, as it is well known in the art. The PACK RATIO on line 27 is clocked via a flip-flop 28, and the clocked pACK RATIO on line 31 is output synchronously with the parallel output word on lines 24 to which it pertains.

The LSB's of the clocked pack ratio n from flip-flop 28 are applied on line 29 to a first input A of a binary adder 30. The MSB of the clocked pack ratio is applied via line 49 to a flip-flop 38. The signal on line 49 will further be referred to as MSB1. The LSB signal on line 29 is stored by the adder 30 by reclocking from its output 47 via a flip-flop 36 and line 41 to a second input B of adder 30. The adder sums the signals on its inputs A and B and it provides a running sum of a previously sum stored LSB signal applied to its input B with a next LSB signal applied to its input A. The LSB's of the clocked running sum at the output of flip-flop 36 are applied as the previously mentioned shift control signal on line 22 to the bit shifter 20. When the running sum is equal to or exceeds the previously described number m, which in the preferred embodiment is m=8, the adder 30 outputs an MSB carry bit on line 48, further referred to as MSB 2. Either signal MSB 1 on line 49 or MSB 2 on line 48 indicates that all 8 valid bits stored in the last input register 14 of the pipeline are being or have been output therefrom, and consequently register 14 is ready to receive new data at the rising edge of the next clock pulse on line 59. In the preferred embodiment the DV IN control signal is high when the READY FOR DATA signal on line 46 is high and the external device is ready to send data on lines 10. The signals on lines 48, 49 are applied via OR-gates 60 and 40 as a READY FOR DATA control signal on line 46, indicating that the data stored in input register 13 is ready to be transferred into register 14, and the data stored in register 12 into register 13, and thus register 12 is ready to receive the next packed 8-bit parallel input word on lines 10.

The previously described signals MSB 1, MSB2 on lines 49, 48 are each stored for one or more clock cycles in flip-flops 38, 37, respectively, depending on the status of the output signals on lines 33, 34 from a logic circuit 32, as it will be further described. The resulting delayed signals MSB 1 DEL on line 53, and MSB 2 DEL on line 52 are applied to logic circuit 32. The logic circuit 32 also receives a DATA VALID IN (DV IN) control signal on line 57, indicating whether there are valid data to be received on input lines 10, a RESET signal on line 58, which is utilized during an initialization process to reset the contents of all the registers to zero, and CLOCK signal on line 59. In the preferred embodiment the DV IN control signal is high when the READY FOR DATA signal on line 46 is high and the external device is ready to send data on lines 10. Based on the combination of its input signals, the logic circuit 32 enables or inhibits a DATA VALID OUT (DV OUT) control signal on line 34. When the signal on line 34 is enabled, the parallel output word on lines 24 is ready to be taken at the rising edge of the next clock pulse. The number of valid bits in each output word is equal to the PACK RATIO OUT signal on line 31, corresponding to the pack ratio n of that output word, as previously described. The control signal on line 34 also enables the flip-flops 36 to 38, thereby allowing to change the shift amount on line 22, as well as the status of the delayed signals MSB 1 DEL and MSB 2 DEL applied to the logic circuit 32. On the other hand, during normal operation logic circuit 32 inhibits generation of the DATA VALID OUT signal on line 34, as follows. When register 14 does not contain valid data, logic circuit 32 provides an INHIBIT control signal on line 33, which in turn inhibits the data out control signal on line 34. Thus the INHIBIT signal on line 33 also disables flip-flops 36 to 38, thereby preventing the shift control signal on line 22 from changing, as well as the status of the signals on lines 52, 53.

It is noted that OR-gates 40 and 60 may be considered as being a part of logic circuit 32, however to simplify the description they are shown as separate elements in the attached drawings.

Now the preferred embodiment of the data unpacker of the invention will be described with reference to FIG. 2. Because of the similarities between the embodiments shown in FIGS. 1 and 2, only those portions of FIG. 2 will be described which differ from FIG. 1. As it is seen from comparison, FIG. 2 shows, in addition to the circuit elements which have been previously described with reference to FIG. 1, a pipeline full logic circuit 23, an OR-gate 55, a comparator 43, and a flip-flop 39.

The pipeline full logic circuit 23 is utilized during initialization, that is to assure that all the input registers 12 to 14 are filled with data before normal operation begins. It receives the DV IN control signal on line 57, the RESET signal on line 58, and the CLOCK on line 59. It contains three series connected flip-flops (shown in FIG. 3), which at start-up are set to zero by the RESET signal on line 58. The first flip-flop 121 receives a DC signal which is clocked during three consecutive clock pulses from the first to the second flip-flop 122 and therefrom to the third flip-flop 123, simultaneously with clocking the input data on line 10 from the input of the first data input register 12 into register 13 and 14, by the clock on line 59, while the DATA VALID IN signal on line 57 is high. After two such clock pulses when the input register 13 is filled with data from input register 12, circuit 23 outputs an ALMOST READY control signal on line 35. At the next such clock pulse, when all 3 input registers are filled with data, circuit 23 outputs a READY control signal on line 25. The ALMOST READY control signal on line 35 and the DV OUT signal on line 34, are applied through OR-gate 55 as a GET PACK RATIO control signal on line 56, which requests that a new PACK RATIO signal be applied on line 27. The READY control signal on line 25 is applied to a ready for data logic circuit 40, corresponding to OR-gate 40 of FIG. 1. Upon receipt of any of its input signals, circuit 40 applies the previously described READY FOR DATA control signal on line 46. The initialization process is thereby finished.

Now the comparator 43 and flip-flop 39 of FIG. 2 will be described. As it has been previously described, in the preferred embodiment the pack ratio applied on lines 27 has a value $n \leq 16$. As it is well known, for the binary representation of number 16 normally five parallel lines are necessary. However, in this particular embodiment, only four parallel lines are utilized as follows. Because the value $n=0$ is not used, zero values on all four parallel lines 27 are utilized to represent $n=16$. Comparator 43 is utilized to detect presence of zero values on all four lines 27, indicating $n=16$, as follows.

Figure 2:
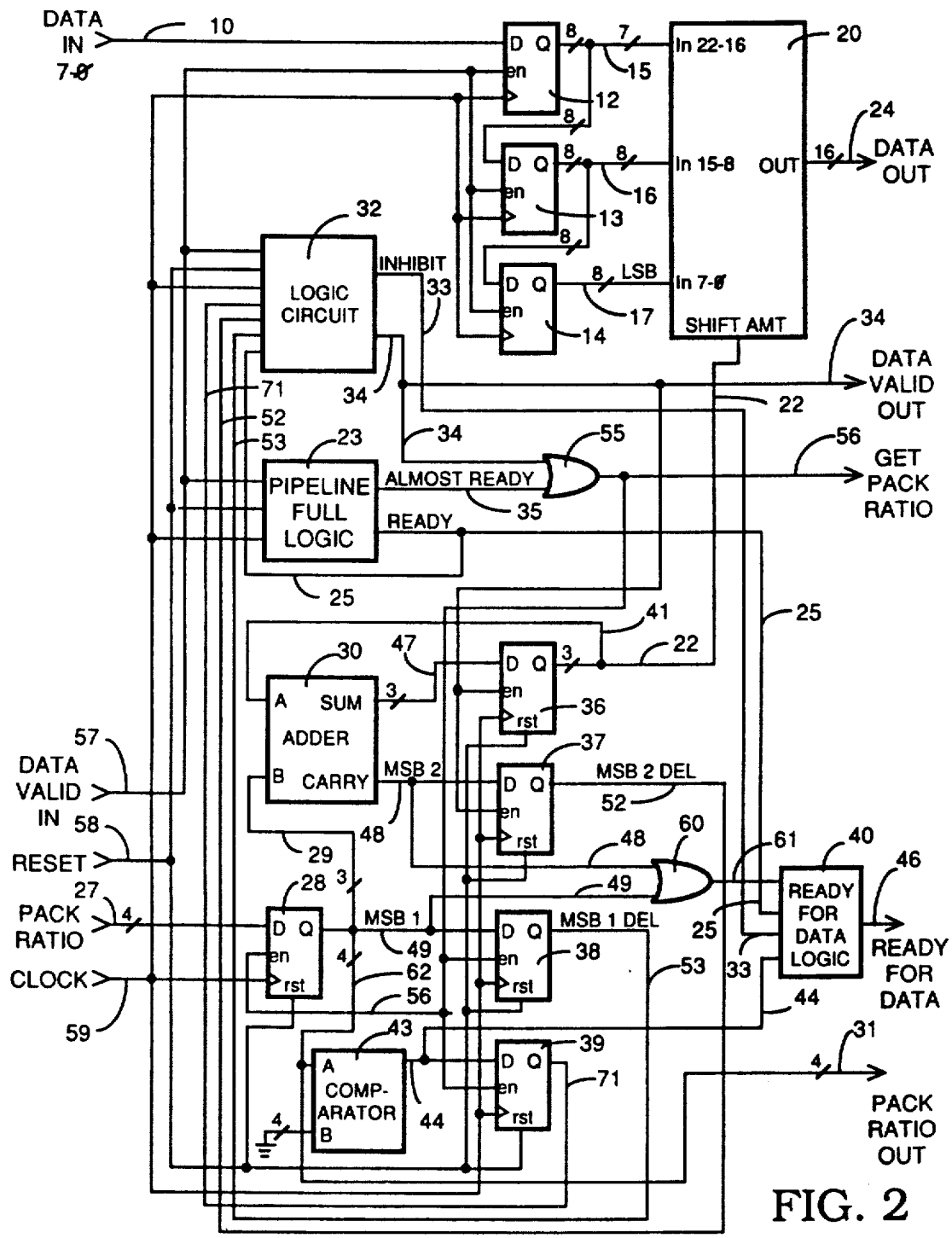
FIG. 2 is a more detailed block diagram of the preferred embodiment of the invention.

With further reference to FIG. 2, the clocked pack ratio on lines 62 from flip-flop 28 is applied to input A of the comparator 43. Its other input B is connected to ground potential. Thus when comparison is obtained, a high output signal on line 44 is clocked via flip-flop 39 as a control signal on line 71 to the logic circuit 32, indicating a pack ratio $n=16$. The signal on line 44 indicating comparison is applied to the ready for data logic circuit 40, which in response thereto provides a high ready for data signal on line 46. In this situation the output word on lines 24 will have 16 bits and thus both input registers 13, 14 of the pipeline will be emptied simultaneously.

The pipeline full logic circuit 23 is described below with reference to the detailed diagram of FIG. 3. Circuit 23 has three flip-flops 121 to 123 connected in series and clocked by the CLOCK signal on line 59. The D-input of the first flip-flop 121 is connected to a high logic level signal, for example +5 Volt. At start-up the contents of all the registers in the unpacker circuit are reset to zero via the RESET line 58. Thereafter when the DV IN control signal on line 57 is high, it enables at a first clock pulse clocking of the high signal level from the input of flip-flop 121 to the input of flip-flop 122, simultaneously with the clocking of the first packed data word at the input of the first register 12 to the input of the second register 13 of the pipeline. At the second clock pulse with DV IN on line 57 high, the data from input register 13 is transferred to the input of the third register 14, and register 12 receives a new packed data word. Simultaneously the signal from the input of flip-flop 122 is clocked to input of flip-flop 123. At the occurrence of the third clock pulse with DV IN on line 57 high, data from the input of register 14 is clocked to its output and thus the data on lines 15 to 17 is ready to be output via the bit shifter 20, whereby the initialization process is finished and normal operation may begin. Simultaneously with the presence of clocked input data on all three groups of parallel data lines 15 to 17, a READY control signal on line 25 is output from flip-flop 123, and applied to logic circuit 32. Thereafter the READY control signal on line 25 remains high during normal operation.

Logic circuit 23 also provides an ALMOST READY control signal on line 35, which occurs before the occurrence of the READY signal on line 25, and has a duration of one clock cycle, as follows. The output signal from flip-flop 122 is applied to a first input of an AND-gate 125. The same signal is applied to a flip-flop 124 and the clocked signal therefrom is applied to a second, inverting input of AND-gate 125 one clock cycle later. Thus at the occurrence of the second clock pulse with DV IN signal high, the output of flip-flop 122 is high, the output of flip-flop 124 is low, AND-gate 125 is enabled and the ALMOST READY signal on line 35 is high. However, at the next clock pulse, output of flip-flop 124 becomes high, thereby disabling gate 125, and the signal on line 35 returns to low. The ALMOST READY signal is gated via OR-gate 55, together with the previously described DV OUT control signal on line 34, and the gated signal is applied as the previously described GET PACK RATIO control signal on line 56.

Now the logic circuit 32 will be described with reference to the detailed circuit diagram of FIG. 3. The MSB 2 DEL signal on line 52 from the adder 30 in FIG. 2, and the MSB 1 DEL signal on line 53 are applied to an OR-gate 70, along with the signal on line 71 indicating that the pack ratio $n=16$. In response to presence of any of these input signals the signal on line 72 is high. Presence of either input signal on line 52 or 53 indicates that the last input register 14 in the pipeline has been emptied. Presence of both input signals on lines 52, 53, simultaneously, or of the signal on line 71 indicates that both registers 13 and 14 were emptied simultaneously. At the same time the clocked DV IN signal on line 75 may be high or low. A high level indicates that at the rising edge of the previous clock pulse DV IN on line 57 was high, and thus data was clocked from input register 13 into 14, and therefore if register 13 had contained valid data, then register 14 now contains valid data. If the clocked DV IN on line 57 is low, data could not be clocked into register 14 at the previous clock and therefore it does not contain valid data. Thus when line 72 is high and line 75 low, AND-gate 73 outputs a high level INHIBIT 1 signal on line 77. It is applied via OR-gate 78 and AND-gate 80, as the previously described INHIBIT control signal on line 33. The signal on line 33 (L) is further applied to an inverting input of AND-gate 81, and therefrom it inhibits the previously described DV OUT control signal on line 34. Thus during normal operation, that is after initialization has been completed, the status of the DV OUT control signal on line 34 is opposite of that of the INHIBIT signal on line 33. The second input of AND-gate 80 receives a one clock delayed READY control signal on line 101 from the pipeline full logic circuit 23 which signal stays high during normal operation. The high READY signal on line 25 is applied to the second input of AND gate 81.

The INHIBIT signal on line 33 may alternatively be generated via a second control signal path, which is parallel to the above-described path, as follows. The previously described MSB 2 DEL and MSB 1 DEL signals on lines 52, 53 are also applied to an AND-gate 90, whose output is applied via line 91 to OR-gate 92, which also receives the previously described signal on line 71. It follows from the above description that the resulting INHIBIT 2A signal on line 93 from OR-gate 92 is high when both input registers 13 and 14 have just been emptied. An AND-gate 94 receives the previously described signals on lines 93 and 75, and it also receives at its inverting input the DV OUT control signal on line 34 which disables gate 94.

With further references to FIG. 3, the INHIBIT 2 signal is generated as follows. We will assume that the DV OUT signal on line 34 is high and data is being output on line 24. We will further assume that all the data from both input registers 13 and 14 has been or is being output, as it is indicated by the simultaneous presence of both signals MSB 1 on line 49 and MSB 2 on line 48, or by the signal on line 44 from comparator 43 (see FIG. 2). At the next positive going edge of the clock signal (further referred to this edge as CLOCK 1), a high level of DV OUT on line 34 enable flip-flops 37 to 39 to be clocked: Consequently, after CLOCK 1, either MSB 1 DEL and MSB 2 DEL on lines 53, 52 are both high, or line 71 is high. This causes OR-gate 92 to be enabled, resulting in high INHIBIT 2A signal on line 93.

Also at CLOCK 1, JK flip-flop 98 clocks its input signals on lines 95 and 34 to its output on line 99. As it has been indicated above, before CLOCK 1, DV OUT on line 34 was high, causing AND-gate 94 to be disabled, and thus the signal on line 95 is low. Thus at CLOCK 1 because the J-input of flip-flop 98 is low and the K-input is high, line 99 goes low. After CLOCK 1 line 93 is high and line 99 is low, enabling gate 96, causing lines 97, 79 and INHIBIT on line 33 go high. This in turn causes DV OUT on line 34 to go low.

Because DV OUT (line 34) is low, clocking of flip-flops 36 to 38 is not enabled, and therefore line 93 will remain high until line 34 goes high again. The output of gate 94 now depends on the status of line 75. If line 75 is high, then before CLOCK 1 line 57 was also high, and at CLOCK 1 data was clocked from input register 12 into 13, and from 13 into 14. In general, line 75 and therefore also line 95 stays low until immediately after a positive going clock edge (henceforth called CLOCK p) at which the data is clocked into register 12 and from register 12 into register 13 and from register 13 into register 14, then lines 75, 95 go high. Thus at CLOCK p line 95 goes high, indicating that the next valid data, which was stored in input register 12 is now in register 13. After CLOCK p the J-input of flip-flop 98 is high and the K-input is low, so at CLOCK (p+1) line 99 goes high. This in turn disables gate 96 and INHIBIT 2 on line 97 goes low.

In the meantime, since at least one of the lines 52, 53 or 71 is high, as it has been disabled above, OR-gate 70 is enabled, and line 72 is high. The output of AND-gate 73 depends on the status of line 75. If at CLOCK (p+1) the data from input register 13 was clocked into register 14, then after CLOCK (p+1) line 75 is high, and line 77 low. However, if at CLOCK (p+1) the data in register 13 was not clocked into register 14, then line 75 is now low, and INHIBIT 1 on line 77 is high, thus rendering DV OUT signal on line 34 low. Thus, INHIBIT 1 goes low after CLOCK (p+1), or some subsequent clock edge, depending on the status of the DV IN signal on line 57. In summary, when both registers 13, 14 are emptied simultaneously, INHIBIT 2 prevents the assertion of DV OUT until valid data from register 12 is clocked into register 13. Thereafter INHIBIT 1 prevents the assertion of DV OUT until the valid data which was originally stored in register 12 is clocked from register 13 into register 14.

It follows from the foregoing description that in a special case when during the operation n≦m, and assuming that the external device is always ready to send packed data words on lines 10, the DV OUT signal on line 34 will stay high, because at each clock pulse there will be valid data in register 14 which may be applied to the bit shifter 20. In this case during normal operation the DV OUT signal may be set to a high level, and the logic circuit 32 may be simplified accordingly.

In another case, when n≧m, the signal MSB 1 on line 49 will stay high during the operation. Consequently, in this case, the READY FOR DATA control signal may be set to a high level and the logic circuit 40 may be deleted.

As it has been described previously, the DV IN signal on line 57 is high when the READY FOR DATA signal on line 46 is high and the external device is ready to send packed data on line 10. Therefore, in a simplified example, when the external device is always ready to send data, the DV IN signal follows the status of the READY FOR DATA signal. Thus during normal operation the DV IN signal may be disregarded and the unpacker circuit may be simplified accordingly. In this example the input registers 12 to 14 may be enabled by the READY FOR DATA signal.

Figure 3:
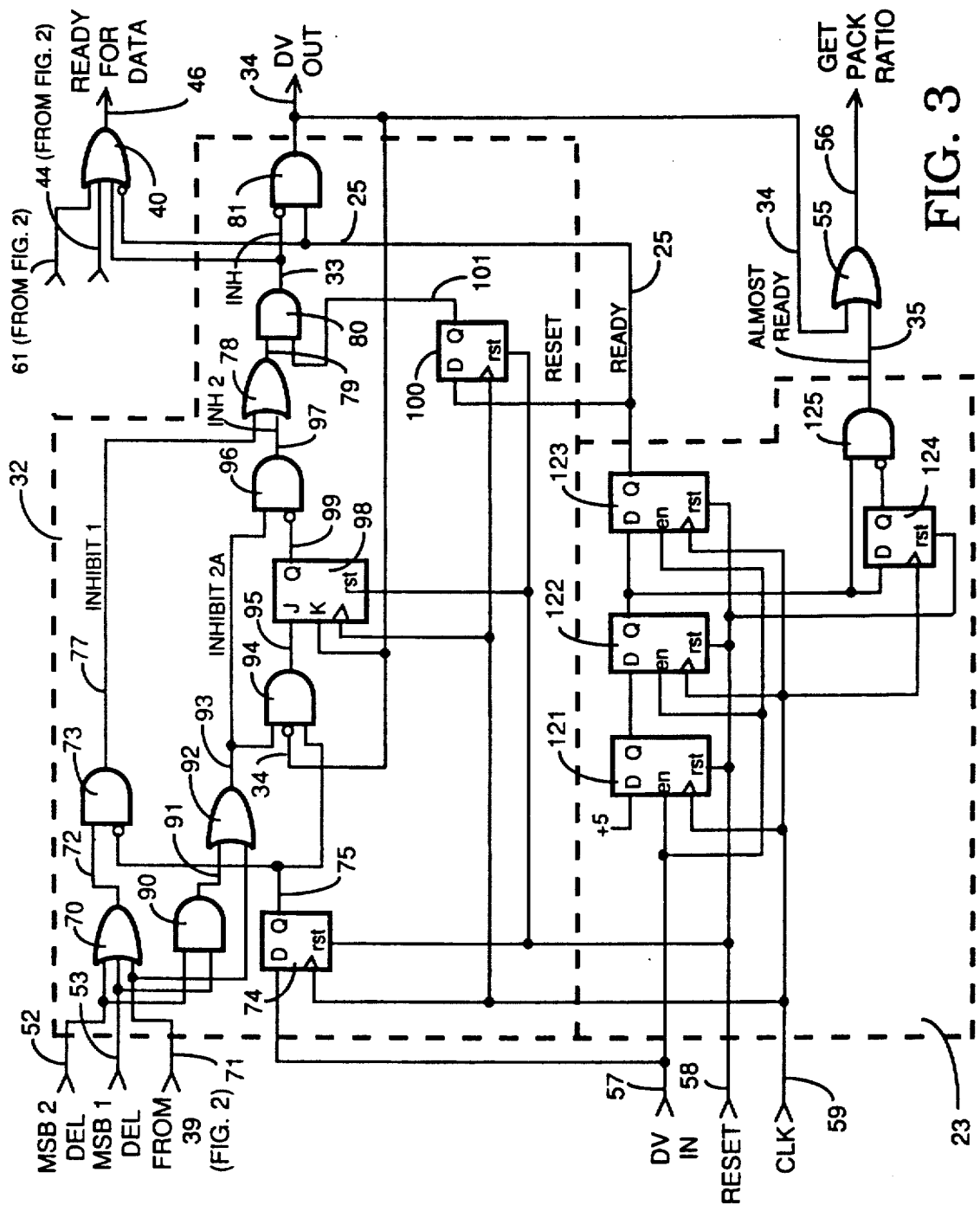
FIG. 3 is a more detailed circuit diagram corresponding to the logic circuit and pipeline full logic of FIG. 2.

An example of the operation of the preferred embodiment of the data unpacker shown in FIGS. 2 and 3 is described below with reference to the timing diagram of FIG. 4.

Figure 4:
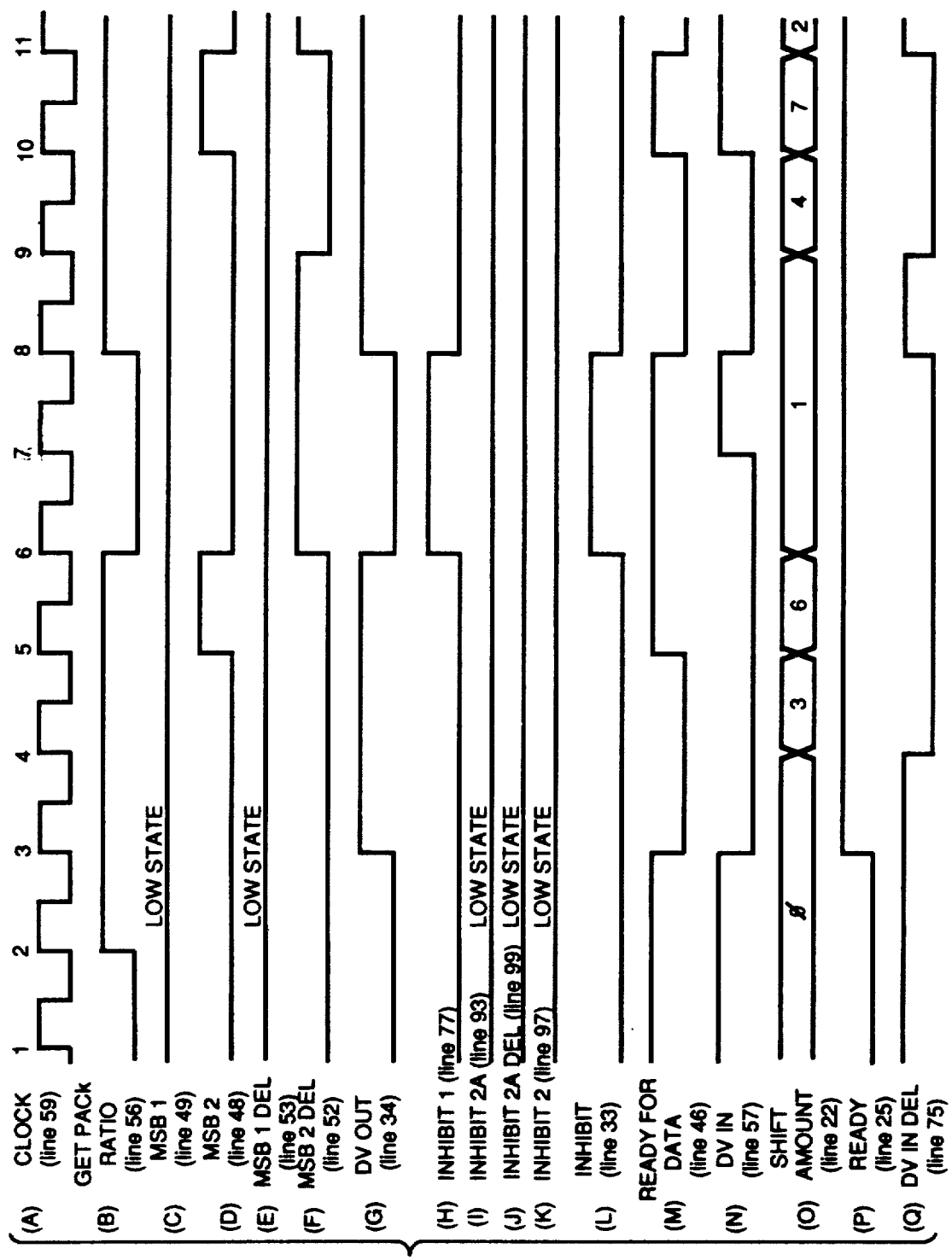
FIG. 4 is a timing diagram showing various control signals utilized in one example of operation of the preferred embodiment.
Figure 5:
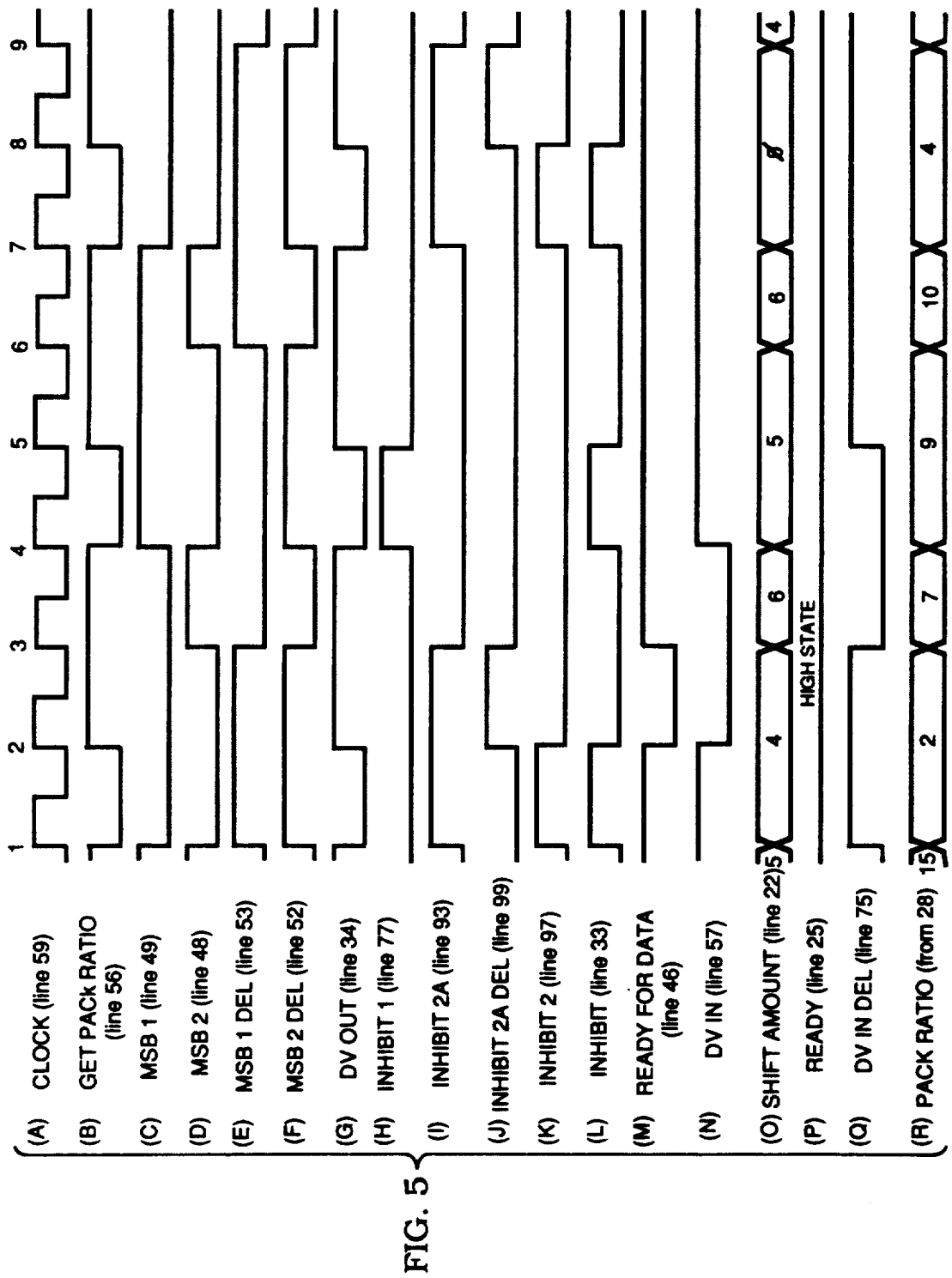
FIG. 5 is a timing diagram showing various control signals utilized in another example of operation of the preferred embodiment.

It is noted that for simplification of the timing diagrams in FIGS. 4 and 5, various changes in the control signals or stored data which generally occur as a result of a positive going edge of a clock pulse, are indicated as occurring simultaneously with that clock edge. Thus, well known signal propagation delays caused by various circuit elements are not shown.

In this example, the parallel input data words received on lines 10 are 8 bits wide, and to simplify the description, the pack ratio is set to n=3 and it does not change during the operation. Thus each parallel output data word on lines 24 will be 3 bits wide. First the initialization process will be described with reference to FIG. 4, which takes place during the first 3 clock cycles. During the initialization the READY signal on line 25 (P) is low, causing READY FOR DATA on line 46 (M) to be high. That READY FOR DATA signal is applied to an external device (not shown) which is sending the input data on line 10, and causes the DV IN control signal on line 57 (N) to be high, to enable clocking of data into input registers 12 to 14. As it has been previously described, the signal on line 57 enables clocking of the input data from lines 10 to the output 15 of the first input register 12, at the rising edge of clock pulse 1 (CLOCK 1) on line 59. At CLOCK 2, the data from register 12 is clocked into register 13, and register 12 receives a next packed input data word. At CLOCK 3, the data from register 13 is clocked into register 14, and the previously stored data in register 12 is clocked into register 13, while a next input data word is clocked into register 12. Thus at CLOCK 3 all the input registers of the pipeline are filled with data. As it has been described before with reference to the pipeline full logic circuit 23, during the second clock pulse on line 59 the ALMOST READY signal on line 35 goes high, in turn rendering high the GET PACK RATIO signal on line 56 (B), and as a result a pack ratio n=3 is received on lines 27. At CLOCK 3 the pack ratio on lines 27 is clocked into flip-flop 28 and the READY signal on line 25 (P) goes high, rendering DV OUT signal on line 34 (G) high. The high READY signal causes the READY FOR DATA signal on line 46 (M) to go low and it will stay low until all the valid data stored in the last input register 14 of the pipeline have been output. Thus after the rising edge of CLOCK 3 all the input registers are filled with data, the initialization process is finished, and the circuit is ready to output the 3-bit parallel output word on lines 24.

At CLOCK 4 the first output word having 3 parallel bits is output on lines 24. At the same time the shift amount on line 22 from adder 30 changes from 0 to 3. Because the 3 bits were taken from the LSB locations of register 14, there are still 5 valid bits remaining therein. After CLOCK 4 the data from registers 14, 13 and 12 are shifted by 3, so the second 3-bit word appears in the LSB positions on lines 24.

At CLOCK 5 the second 3-bit word is output, leaving only 2 valid bits in register 14. The clocked shift amount on line 22 (O) changes to 6. After CLOCK 5 the running sum provided by adder 30 on lines 47, 48 (D) is $3+3+3=9$, that is it exceeds 8, and consequently the MSB 2 signal on line 48 (D) goes high, causing the READY FOR DATA signal on line 46 (M) to go high.

At CLOCK 6 the 2 bits from register 14 and 1 bit from register 13 are clocked out on lines 24, and the bit shift amount on line 22 (O) changes from 6 to 1. The MSB 2 signal on line 48 (D) causes MSB 2 DEL signal on line 52 (F) to go high at CLOCK 6. After CLOCK 5, as mentioned above, the READY FOR DATA line 46 (M) went high. Normally in response to that high signal the external device which sends the input data on line 10 would render the DV IN signal high. However, in the present example DV IN on line 57 (N) is low and the sending device is not ready to send data until after CLOCK 7 when the DV IN signal changes to high. The resulting delayed DV IN on line 75 (Q) is low, causing, along with high MSB 2 DEL signal on line 52 (F), the INHIBIT 1 signal on line 77 (H) to go high. Consequently, the INHIBIT signal on line 33 (L) from logic circuit 32 is high, in turn inhibiting the DATA VALID OUT control signal on line 34 (G).

Before CLOCK 8 the DV IN signal on line 57 (N) changes to high, indicating that input data is now available on lines 10, and enabling input registers 12 to 14. Thus at CLOCK 8 data is transferred from register 13 to 14, from register 12 to 13, and register 12 receives a new 8-bit packed parallel input word. After CLOCK 8 the INHIBIT signal on line 33 (L) changes to low, and the DV OUT on line 34 (G) to high.

Before CLOCK 9 the adder is adding $1+3=4$, so MSB 2 on line 48 (D) is low. At CLOCK 9 DV OUT is high, and therefore flip-flop 37 is clocked and the MSB 2 DEL signal on line 52 (F) goes low. The shift amount on line 22 (O) changes to $1+3=4$. The DV OUT signal on line 34 (G) is high and therefore the fourth 3-bit parallel word is output at CLOCK 9 on lines 24.

At CLOCK 10 the fifth 3-bit word on lines 24 is output. After clock 10 the READY FOR DATA signal on line 46 (M) goes high, because the adder 30 is adding $7+3=10=8+2$, causing MSB 2 on line 48 (D) to go high, in turn causing the READY FOR DATA signal on line 46 (M) to go high.

At clock 11 the remaining 1 bit from input register 14 and 2 bits from register 13 are output and the shift amount on line 22 (O) changes to 2. DV IN on line 57 (N) is high and thus data is transferred from register 12 to 13 and from register 13 to 14, and register 12 receives new data.

Another example of operation of the preferred embodiment of the unpacker shown in FIGS. 1 to 3 will now be described with reference to the timing diagram of FIG. 5. In this example a different pack ratio n is applied on lines 27 for each parallel output data word on lines 24. In this example the circuit has been previously initialized, and the operation has started. Presently at the positive going edge of clock pulse 1 (CLOCK 1) there are 5 invalid bits and 3 valid bits stored in the input register 14, that is, the present shift amount on line 22 from flip-flop 36 (O) is 5, and a pack ratio n=15 is at the output of flip-flop 28 (R). Both the INHIBIT 1 (H) and INHIBIT 2 (K) signals on lines 77 and 97 are low, and DV IN on line 57 (N) is high. Consequently the INHIBIT signal on line 33 (L) is low and the DV OUT signal on line 34 (G) is high. Therefore, at CLOCK 1 a 15-bit data word is clocked out from bit shifter 20 on lines 24. Thus before CLOCK 1 the adder adds $5+15$, therefore MSB 2 on line 48 (D) is high. After CLOCK 1 the MSB 2 DEL on line 52 (F) goes high. Before CLOCK 1 register 14 stored 5 invalid bits and 3 valid bits. Thus the 15 valid bits from the output data word were shifted by 5 bits, and 3 of these output data bits were taken from register 14, 8 from register 13, and 4 from register 12. Consequently, registers 13 and 14 are being emptied and the shift amount on line 22 (O) changes to 4.

The high MSB 2 signal on line 48 (D) causes the READY FOR DATA signal on line 46 (M) to be high before CLOCK 1, and also before CLOCK 1 DV IN signal on line 57 (N) is high, indicating that input data is available. Thus at CLOCK 1 the data from input register 13 is transferred to register 14 and the data from register 12 is transferred to register 13, and register 12 receives a new packed data word on lines 10. Because after CLOCK 1 both MSB 1 DEL (E) and MSB 2 DEL (F) on lines 53, 52 go high, INHIBIT 2 on line 97 (K) also goes high, and consequently DV OUT on line 34 (G) changes to low and remains low until after CLOCK 2, when the DV IN signal on line 57 (N) causes via line 75, gate 94, line 95 and flip-flop 98 the INHIBIT 2A DEL signal on line 99 (J) to go high, in turn causing the INHIBIT 2 on line 97 (K) to go low. Therefore no data is output on lines 24 at CLOCK 2 and the SHIFT AMOUNT of 4 (O) remains unchanged.

At CLOCK 1 the pack ratio n=2 is clocked into register 28 (R), and at CLOCK 3 DV OUT on line 34 (G) is high and the 2 bits are output on lines 24 from input register 14 via bit shifter 20. The SHIFT AMOUNT (O) now changes to $4+2=6$. Therefore there are still 2 valid bits remaining in register 14.

At CLOCK 3 the pack ratio n=7 is clocked into register 28 (R) and since DV OUT on line 34 (G) is high, at CLOCK 4 there are 7 valid bits output on lines 24, of which 2 are output from register 14 and 5 from register 13. Also at CLOCK 4 the unpacker would be ready to receive data because prior to CLOCK 4 the READY FOR DATA on line 46 (M) is high. However, the external device is not ready to send data, and therefore prior to CLOCK 4 the DV IN signal on line 57 (N) is low. Consequently after CLOCK 4 register 14 is empty, and register 13 stores 3 valid bits. At CLOCK 4 the MSB 2 signal on line 48 (D) is high, and also DV OUT on line 34 (G) is high. Consequently, flip-flop 37 is enabled and the MSB 2 DEL signal on line 52 (F) changes to high, in turn INHIBIT 1 on line 77 (H) goes high, and DV OUT on line 34 (G) goes low. Therefore, data is not output from the circuit. When data becomes available after CLOCK 4, DV IN on line 57 (N) goes high, and after one clock cycle INHIBIT 1 on line 77 (H) goes low.

At CLOCK 5 DV OUT on line 34 (G) is low, and thus data is not output. Because DV IN (N) is high, new data is clocked into input register 12, and the data from register 12 is clocked into 13 and from register 13 into 14. The SHIFT AMOUNT on line 22 (O) is 5, and a 9-bit word (3 bits from register 14 and 6 bits from register 13) is shifted by the bit shifter 20 and appears on output lines 24. INHIBIT 1 (H) went low, so DV OUT (G) goes high, and at CLOCK 6 the 9-bit word is clocked out.

At CLOCK 6, because DV IN on line 57 (N) is high, new data is clocked into input register 12 and the previously stored data in registers 12, 13 is transferred into registers 13, 14 of the pipeline. The new pack ratio is 10 and it is clocked into flip-flop 28 (R). The output of adder 30, which was $5+1=6$, is clocked into register 36 and it becomes the new SHIFT AMOUNT on line 22 (O). There are no INHIBIT signals present, therefore DV OUT on line 34 (G) is high.

At CLOCK 7 the 10-bit output word is clocked out. After CLOCK 6 the adder 30 is adding $2+6$, where 2 is the LSB's of the pack ratio $n=10$ (R), and 6 is the shift amount on line 22 (O). The resulting sum 8 renders MSB 2 (D) high and the LSB on lines 47 is zero. At the same time, because 10 is greater than 8, MSB 1 on line 49 (C) is high. The presence of high level signals on both MSB 1 (C) and MSB 2 (D) indicates that both registers 13 and 14 are being emptied. This is also shown by the fact that because the shift amount is 6, there are 6 non-valid bits in register 14, and the 10 valid bits of the output word will be provided by 2 valid bits from register 14 and 8 from register 13.

At CLOCK 7 flip-flops 37, 38 are clocked, and consequently after CLOCK 7 MSB 1 DEL (E) and MSB 2 DEL (F) on lines 53, 52 are both high. This in turn enables gates 90 and 91 (FIG. 3) and causes INHIBIT 2A on line 93 (I) to go high. Because DV OUT was high before CLOCK 7, gate 94 was disabled, so that the J-input of flip-flop 98 was low while its K-input was high. Therefore, after CLOCK 7, the delayed INHIBIT 2A signal on line 99 (J) is low. As a result of high INHIBIT 2A and low INHIBIT 2A DEL the INHIBIT 2 on line 97 (K) is high, causing INHIBIT on line 33 (L) to go high, and DV OUT on line 34 (G) to go low.

Before CLOCK 7 the DV IN signal on line 57 was high. Therefore, at CLOCK 7, data is clocked from register 13 into 14, from register 12 into 13, and from lines 10 into register 12. After CLOCK 7, register 14 still has 8 bits of invalid data, therefore it does not contain any valid data, but register 13 now contains valid data.

At CLOCK 8, the DV IN signal on line 57 is high, clocking the valid data from register 13 into 14, from 12 into 13, and clocking new data into register 12. Before CLOCK 8 the INHIBIT 2A signal on line 93 (I) is high, DV OUT on line 34 (G) is low, and line 75 (Q) is high. Therefore at CLOCK 8 line 95 in FIG. 3 is high, and consequently INHIBIT 2A DEL on line 99 (J) goes high. This causes INHIBIT 2 on line 97 (K) to go low, causing also INHIBIT on line 33 (L) to go low, and allowing DV OUT on line 34 (G) to go high. Since at CLOCK 7 a new PACK RATIO equal to 4 was clocked into flip-flop 28 (R), at CLOCK 9 a 4-bit word is output on lines 24.

It is understood that although certain preferred embodiments of the present invention have been illustrated and described, various modifications, alternatives and equivalents thereof will become apparent to those skilled in the art, without departing from the scope of the invention as set forth in the appended claims.

What is claimed is:

1. An apparatus for unpacking data, receiving packed parallel data words having a width equal to a fixed number of m valid data bits, and providing parallel output data words having a width equal to a variable number of n valid data bits, where n, m are positive integers, comprising:

input register means for receiving and storing said packed parallel data words in a received order, wherein said input register means comprises respective parallel m-bit registers connected in a pipeline, each said parallel m-bit registers storing one said packed parallel data word, respective parallel outputs of each m-bit register being coupled to respective parallel inputs of a consecutive register in said pipeline, and the respective parallel outputs of all said m-bit registers being coupled to respective parallel inputs of a bit shifter means;

said bit shifter means for shifting said packed parallel data words from said input register means by a number of bit positions indicated by a shift control signal to provide an n-bit wide parallel output data word;

said apparatus further receiving a pack ratio control signal corresponding to a binary representation of said positive integer n for each of said parallel output data words, said pack ratio having a most significant bit (MSB) portion when said positive integer n is equal to or greater than said positive integer m, and at least significant bit (LSB) portion, corresponding to least significant bits of said positive integer n, said MSB portion being applied as a first MSB control signal;

adder means for receiving and summing subsequently received LSB portions of said pack ratio control signal to provide a running sum, and for providing a second MSB control signal when said running sum is equal to or greater than said positive integer m, said adder means further providing said shift control signal corresponding to an LSB portion of said running sum; and a logic circuit receiving said first and second MSB control signal, and in response to either of these signals, for providing a ready for data control signal indicating that said input register is ready to receive a packed parallel data word, and a data valid out control signal indicating that said bit shifter means is ready to output said parallel output data word.

2. The apparatus of claim 1 wherein said positive integer n is equal to or less than said positive integer m, and wherein said data valid out control signal is maintained at a constant logic level indicating that said bit shifter means is ready to output said parallel output data word.

3. The apparatus of claim 1 wherein said positive integer n is equal to or greater than said positive integer m, said first MSB control signal is maintained at a high logic level, and said ready for data control signal is maintained at a logic level indicating that said input register is ready to receive a packed parallel data word.

4. The apparatus of claim 1 wherein in response to said ready for data control signal a packed parallel data word is clocked into a first m-bit register of said pipeline, and simultaneously each previously received data word is clocked from a respective m-bit register into a consecutive m-bit register of said pipeline.

5. The apparatus of claim 1, wherein in response to a simultaneous occurrence of both said first and second MSB control signals, indicating that the last two consecutive m-bit registers of said pipeline do not contain valid bits, said inhibit control signal disables said data valid out control signal until both said registers are filled with valid data.

6. The apparatus of claim 1 wherein said logic circuit enables said data valid out control signal when at least one valid data bit is stored in a last m-bit register of said pipeline, and said logic circuit disables said data valid out control signal when said last m-bit register does not contain valid bits, and inhibits the output of said parallel data words provided by said bit shifter means, inhibits the receipt of a subsequent pack ratio control signal, and inhibits a change in said shift control signal, respectively.

7. The apparatus of claim 1 wherein said positive integer n is equal to or less than 16, said packed parallel data words have a width of said positive integer m equal to 8 valid data bits, and said input register means comprises three 8-bit registers connected in said pipeline, and wherein said number of bit positions indicated by said shift control signal is between 0 and 7.

8. An apparatus for unpacking data, receiving packed parallel data words having a width equal to a fixed number of m valid data bits, and providing parallel output data words having a width equal to a variable number of n valid data bits, where n, m are positive integers, comprising:
input register means for receiving and storing said packed parallel data words in a received order;
bit shifter means for shifting said packed parallel data words from said input register means by a number of bit positions indicated by a shift control signal to provide an n-bit wide parallel output data word;
said apparatus further receiving a pack ratio control signal corresponding to a binary representation of said positive integer n for each of said parallel output data words, said pack ratio having a most significant bit (MSB) portion when said positive integer n is equal to or greater than said positive integer m, and a least significant bit LSB portion, corresponding to least significant bits of said positive integer n, said MSB portion being applied as a first MSB control signal;
adder means for receiving and summing subsequently received LSB portions of said pack ratio control signal to provide a running sum, and for providing a second MSB control signal when said running sum is equal to or greater than said positive integer m, said adder means further providing said shift control signal corresponding to an LSB portion of said running sum;
a logic circuit receiving said first and second MSB control signal, and in response to either of these signals, for providing a ready for data control signal indicating that said input register is ready to receive a packed parallel data word, and a data valid out control signal indicating that said bit shifter means is ready to output said parallel output data word; and
wherein in response to said ready for data control signal said logic circuit further receives a data valid in control signal indicating that said received packed parallel data words are valid, and enabling input of said valid data words into said input register means, and in response to an absence of said data valid in control signal said logic circuit providing an inhibit control signal to inhibit output of said parallel data words from said bit shifter means, inhibit receipt of a subsequent pack ratio control signal, and inhibit a change in said shift control signal.

9. An apparatus for unpacking data, receiving packed parallel data words having a width equal to a fixed number of m valid data bits, variable number of n valid data bits, wherein n, m are positive integers and is equal to or greater than m, comprising:
input register means for receiving and storing said packed parallel data words in a received order, wherein said input register means comprises respective parallel m-bit registers connected in a pipeline, each said parallel m-bit registers storing one said packed parallel data word, respective parallel outputs of each m-bit register being coupled to respective parallel inputs of a consecutive register in said m-bit registers being coupled to respective parallel inputs of a bit shifter means;
said bit shifter means for shifting said packed parallel data words from said input register means by a number of bit positions indicated by a shift control signal to provide an n-bit wide parallel output data word;
said apparatus further receiving a pack ratio control signal corresponding to a binary representation of said positive integer n for each of said parallel output data words, said pack ratio having a most significant bit (MSB) portion and a least significant bit (LSB) portion corresponding to least significant bits of said positive integer n;
adder means for receiving and summing subsequently received LSB portions of pack ratio control signal to provide a running sum, and for providing an MSB control signal when said running sum is equal to or greater than said positive integer m, said adder means further providing said shift control signal corresponding to an LSB portion of said running sum; and
a logic circuit for receiving said MSB control signal, and in response to the MSB control signal, for providing a data valid out control signal indicating that said bit shifter means is ready to output said parallel output data word.

10. An apparatus for unpacking data, receiving packed parallel data words having a width equal to a fixed number of m valid data bits, and providing parallel output data words having a width equal to a variable number of n valid data bits, wherein n, m are positive integers and n is equal to or less than m, comprising:
input register means for receiving and storing said packed parallel data words in a received order, wherein said input register means comprises respective parallel m-bit registers connected in a pipeline, each said parallel m-bit register storing one said packed parallel data word, respective parallel outputs of each m-bit register being coupled to respective parallel inputs of a consecutive register in said pipeline, and the respective parallel outputs of all said m-bit registers being coupled to respective parallel inputs of a bit shifter means;

said bit shifter means for shifting said packed parallel data words from said input register means by a number of bit positions indicated by a shift control signal to provide an n-bit wide parallel output data word;

said apparatus further receiving a pack ratio control signal corresponding to a binary representation of said positive integer n for each of said parallel output data words, said pack ratio having a most significant bit (MSB) portion when said positive integer n equals said positive integer m, and a least significant bit (LSB) portion corresponding to least significant bits of said positive integer n, said MSB portion being applied as a first MSB control signal;

adder means for receiving and summing subsequently received LSB portions of said pack ratio control signal to provide a running sum, and for providing a second MSB control signal when said running sum is equal to or greater than said positive integer m, said adder means further providing said shift control signal corresponding to an LSB portion of said running sum; and a logic circuit for receiving said MSB control signal, and in response to the MSB control signal, for providing a data valid out control signal indicating that said bit shifter means is ready to output said parallel output data word.

* * * * *